United States Patent
Fossey, Jr. et al.

(10) Patent No.: US 6,911,955 B2
(45) Date of Patent: Jun. 28, 2005

(54) HIGH STRENGTH FABRIC STRUCTURE AND SEAM THEREFOR WITH UNIFORM THICKNESS AND A METHOD OF MAKING SAME

(75) Inventors: William H. Fossey, Jr., Arlington, MA (US); Sharon A. Elsworth, Mason, NH (US)

(73) Assignee: Raytheon Company, Waltham, MA (US)

( * ) Notice: Subject to any disclaimer, the term of this patent is extended or adjusted under 35 U.S.C. 154(b) by 82 days.

(21) Appl. No.: 10/620,888

(22) Filed: Jul. 16, 2003

(65) Prior Publication Data

US 2005/0013961 A1 Jan. 20, 2005

(51) Int. Cl.[7] .................................................. B32B 5/12
(52) U.S. Cl. ......................... 343/872; 428/60; 428/105; 428/107; 428/109; 428/110
(58) Field of Search ............................... 428/60, 53, 58, 428/105, 107, 109, 110, 111, 113; 343/872

(56) References Cited

U.S. PATENT DOCUMENTS 4,279,676 A  *  7/1981  Morrison et al. ........... 156/159

* cited by examiner

*Primary Examiner*—Alexander S. Thomas
(74) *Attorney, Agent, or Firm*—Iandiorio & Teska

(57) ABSTRACT

A high strength flexible fabric structure including a plurality of flexible fabric sections, each section including a plurality of plies of alternating fiber orientation. A joint is located between adjacent sections. The plies of each section are offset to form a uniform thickness seam between the two sections without any overlap of plies of like fiber orientation.

84 Claims, 4 Drawing Sheets

FIG. 6

HIGH STRENGTH FABRIC STRUCTURE AND SEAM THEREFOR WITH UNIFORM THICKNESS AND A METHOD OF MAKING SAME

FIELD OF THE INVENTION

This invention relates to a high strength fabric of uniform thickness throughout, including seam areas where fabric sections are joined together, for use in fabric structures, especially radomes, to reduce radio frequency transmission losses.

BACKGROUND OF THE INVENTION

Air-supported flexible fabric structures include army shelters, collapsible fuel and water storage tanks, communication radomes and radar radomes for antenna protection, hangars, shelters, sporting complex "domes" and other structures. Such fabric structures provide for a controlled environment and serve as protection from thermal distortions, sunlight, rain, and other elements. In other examples, engineered inflatables using fabric include airships, aerostats, blimps, air beams and air floats, air bags, and impact absorbers. Architectural fabrics can also be found in sports complexes, transportation complexes, amphitheaters, and outdoor pavilion covers. Industrial fabric applications can be found in odor containment covers for municipal and industrial wastewater treatment tanks.

Currently, high strength, structural fabric seaming technology utilizes heat weldable, thermoplastic, "overlap" or "butt-joint" seams to join together various fabric sections that make up the fabric structure. In fact, all known high strength fabric structures use "overlap" or "butt-joint" techniques.

A disadvantage of current fabric structures and seam configurations is that they produce undesirable thickness discontinuities in the resulting structure. Among other things, these thickness discontinuities cause localized stress concentrations which increase strength demands on the overall structure. And, for radar applications, such as the use of fabric in radomes, radio frequency (RF) transmission losses result from the thickness discontinuities produced by "overlap" or "butt-joint" seams. RF waves travelling through thicker areas of the radome created by overlapping or butt-joint seams travel at slower speeds, are reflected or scattered, and thus cause undesirable radio frequency losses and a reduction in RF performance. Consequently, more power is required to compensate for RF losses, at great expense. A reduction in performance of 15–20% produces a loss on the order of 0.10 dB, and such a loss may translate into a seven figure cost increase in the radar system protected by the radome.

BRIEF SUMMARY OF THE INVENTION

It is therefore an object of this invention to provide a high strength fabric structure with a uniform thickness.

It is a further object of this invention to provide a high strength fabric seam without any or at least a reduction in overlapping or butt-joint seams.

It is a further object of this invention to provide such high strength fabric seam for use in flexible fabric structures and air-supported structures including radomes, engineered inflatables, architectural fabrics, and industrial fabrics.

It is a further object of this invention to provide a high strength fabric structure useful as radomes to reduce radio-wave frequency (RF) losses.

It is a further object of this invention to provide such a radome that reduces the power requirements and cost of the radar antenna system protected by the radome.

The invention results from the realization that a high strength fabric seam with uniform thickness and lower RF losses is achieved by specially orienting layers or plies of fibers in a matrix material and stacking the plies at the seam between two fabric sections in a staggered or offset configuration.

This invention features a high strength flexible fabric structure including a plurality of flexible fabric sections, each section including a plurality of plies of alternating fiber orientation. In one example, there is a joint between adjacent sections wherein the plies of each section are offset to form a uniform thickness seam between the two sections without any overlap of plies of like fiber orientation.

In one preferred embodiment, the flexible fabric structure may include at least three plies in each section. The first and third plies may have fibers oriented at 0° and 90° and a second ply may have fibers biased at ±45°. The ply fibers may be woven, knitted or unidirectional. The fibers of each ply may be disposed in a flexible matrix material such as a polyurethane resin material.

The plies of each section may be heat welded together or laminated together and the sections may be heat welded or laminated at the joint. Other known heat and pressure inducing practices equivalent to heat welding or lamination may be utilized. The high strength flexible fabric structure may be a radome surrounding a radar system.

In one example, the first fabric section may include an edge with a first ply extending outward from a second ply. The second ply itself may extend outward from a third ply. An adjacent second section may have an adjacent edge with a first ply offset inward of a second ply. The second ply itself may be offset inward of a third ply, such that at the joint between the two sections, the first ply of the first section is disposed on the second ply of the second section, and the second ply of the first section is disposed on the third ply of the second section.

This invention also features a flexible fabric structure having first and second fabric sections with first and third plies including a plurality of fibers in a flexible matrix material oriented in a first direction, preferably 0° and 90° respectively, and a second ply including a plurality of fibers in a flexible matrix material oriented in a second direction, which may be biased at ±45°. A joint between the first and second sections may be structured and arranged such that the plies of the first section are in a staggered configuration with the plies of the second section so that the joint has a thickness the same as the thickness of the first and second sections.

This invention also features a high strength flexible fabric structure which includes a plurality of flexible fabric sections, each section including a plurality of plies, each ply having fibers disposed in a flexible matrix and a joint between adjacent first and second sections. The first section may have an edge with a first ply thereof extending outward from a second ply and the second adjacent section may have an edge with a first ply thereof offset inward from a second ply and the first ply of the first section may be disposed on the second ply of the second section. The first section may further include a third ply offset inward from the second ply of the first section. The second adjacent section may further include a third ply extending outward from the second ply of the second section, and the second ply of the first section may be disposed on the third ply of the second section.

This invention further features a high strength flexible fabric structure that includes a plurality of flexible fabric sections, each section including at least three plies, a first ply having fibers oriented at 0° and 90°, a second ply having fibers biased at ±45°, and a third ply having fibers oriented at 0° and 90°, and a joint between adjacent sections wherein the plies of each section are offset to form a uniform thickness seam between two sections without overlap of plies of like fiber orientation.

This invention also features a flexible fabric structure with uniform seam thickness including a first fabric section comprising a first ply including a plurality of fibers oriented in a first direction, a second ply including a plurality of fibers oriented in a second direction, a third ply comprising a plurality of fibers oriented in the first direction, and a second fabric section. The second fabric section may include a first ply including a plurality of fibers oriented in the first direction, a second ply including a plurality of fibers oriented in the second direction, a third ply including a plurality of fibers oriented in the first direction, wherein a joint between the first and second sections is structured and arranged such that the plies of the first section are in a staggered configuration with the plies of the second section such that the joint has a thickness the same as the thickness of the first and second fabric sections.

This invention further features a method of manufacturing a high strength flexible fabric structure which includes forming a plurality of flexible fabric sections to each include a plurality of plies of alternating fiber orientation. The method further may include offsetting the plies of each section, and joining adjacent sections such that no plies of like fiber orientation overlap. In one preferred embodiment, there are at least three plies in each section, with the first and third plies having fibers oriented at 0° and 90° and the second ply having fibers biased at ±45°. The method may further include weaving the ply fibers, and disposing the fibers of each ply in a flexible matrix material such as a polyurethane resin material. The ply fibers may be knitted or unidirectional. The sections may be joined by heat welding or laminating the plies of each section together, and may include heat welding or laminating the sections at the joint. Other known heat and pressure inducing practices equivalent to heat welding or lamination may be used. The method may further include configuring the flexible fabric sections as a radome covering.

The offsetting step may include extending a first ply of a first section outward from a second ply, and extending the second ply itself outward from a third ply. A first ply of a second section may be offset inward from a second ply thereof and the second ply may be offset inward from a third ply. The joining step may include disposing the first ply of the first section on the second ply of the second section, and disposing the second ply of the first section on the third ply of the second section.

A method in accordance with the subject invention may also include forming a plurality of fabric sections and structuring and arranging each section to abut and join an adjacent section without any overlap between the sections, thus forming a fabric structure of uniform thickness. The method may include stacking the first, second, and third plies and joining the first, second, and third plies with like oriented plies of a second flexible fabric portion in an offset configuration.

This invention also features a method for producing a flexible fabric structure of uniform thickness, including the steps of forming a first flexible fabric portion with a first ply of flexible fabric including a plurality of fibers oriented at 0° and 90°, a second ply of flexible fabric including a plurality of fibers oriented at ±45°, and a third ply of flexible fabric including a plurality of fibers oriented at 0° and 90°, stacking the first, second, and third plies, and joining the first, second, and third plies with like oriented plies of a second flexible fabric portion in an offset configuration and forming a uniform thickness seam.

This invention further features a high strength flexible fabric seam with at least two flexible fabric sections, each section including a plurality of plies of alternating fiber orientation. The plies of each section maybe offset and joined without any overlap of plies of like fiber orientation. In one preferred embodiment there are at least three plies in each section. The first and third plies may have fibers oriented at 0° and 90°. The second ply may have fibers biased at ±45°. The ply fibers may be woven, knitted, or unidirectional, and may be disposed in a flexible matrix material such as a polyurethane resin material. The plies of each section may be heat welded or laminated together and the sections may be heat welded or laminated together, and other equivalent heat and pressure inducing practices similar to heat welding or lamination may be used.

The seam of this invention may further include a first section including an edge with the first ply thereof extending outward from the second ply. The second ply itself may extend outward from the third ply. The adjacent second section has an adjacent edge with its first ply offset inward of a second ply, which is itself offset inward of the third ply so that the first ply of the first section is disposed on the second ply of the second section. The second ply of the first section is disposed on the third ply of the second section.

The flexible fabric seam with uniform thickness of this invention may also include first and second fabric sections each having first and third plies with a plurality of fibers in a flexible resin matrix material oriented in a first direction. A second ply may include a plurality of fibers in a flexible resin matrix material oriented in a second direction. The plies of the first section may be in a staggered configuration with and joined with the plies of the second section so that the seam has a thickness equal to a combined thickness of the first, second, and third layers of the first and second fabric sections.

This invention also features a high strength flexible fabric seam including at least two flexible fabric sections, each section including a plurality of plies, each ply having fibers disposed in a flexible matrix wherein the first section has an edge with a first ply thereof extending outward from a second ply. The second adjacent section may have an edge with a first ply thereof offset inward from a second ply, and the first ply of the first section may be disposed on the second ply of the second section. The first section may include a third ply offset inward from the second ply of the first section. The second adjacent section may include a third ply extending outward from the second ply of the second section and the second ply of the first section may be disposed on the third ply of the second section.

This invention further features a flexible fabric seam with uniform thickness including a first fabric section having a first ply including a plurality of fibers oriented in a first direction, a second ply including a plurality of fibers oriented in a second direction, a third ply comprising a plurality of fibers oriented in the first direction, and a second fabric section. The second fabric section may include a first ply including a plurality of fibers oriented in the first direction, a second ply including a plurality of fibers oriented in the second direction, and a third ply including a plurality of fibers oriented in the first direction. The plies of the first section may be in a staggered configuration with and joined with the plies of the second section such that the seam has a thickness equal to a combined thickness of the first, second, and third layers of the first and second fabric sections.

A method of manufacturing a high strength flexible fabric seam may include forming a plurality of flexible fabric sections to each include a plurality of plies of alternating fiber orientation, offsetting the plies of each section, and joining adjacent sections such that no plies of like fiber orientation overlap.

This invention further features a method of manufacturing a high strength flexible fabric seam, the method comprising forming a plurality of flexible fabric sections to each include at least three of plies of alternating fiber orientation, offsetting the plies of each section, joining adjacent sections such that no plies of like fiber orientation overlap, weaving the ply fibers, and disposing the fibers of each ply in a flexible matrix material.

This invention also features a radome structure which includes a plurality of flexible fabric sections. In one example, each section may include a plurality of plies of alternating fiber orientation. The radome may further include a joint between adjacent sections, with the plies of each section offset to form a uniform thickness seam between the sections without overlap of plies of like fiber orientation.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

Figure 1:
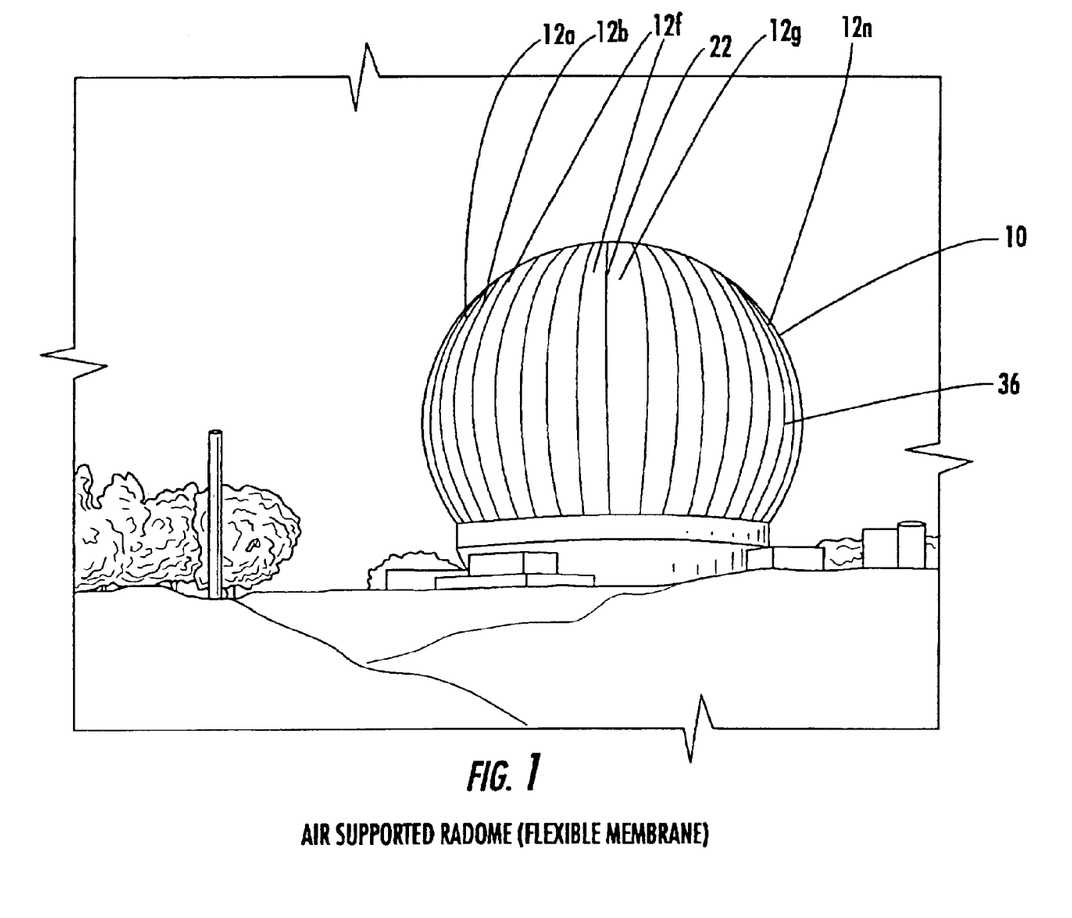
FIG. 1 is a schematic view of a typical air supported ground-based radome with a flexible membrane or fabric covering.
Figure 2:
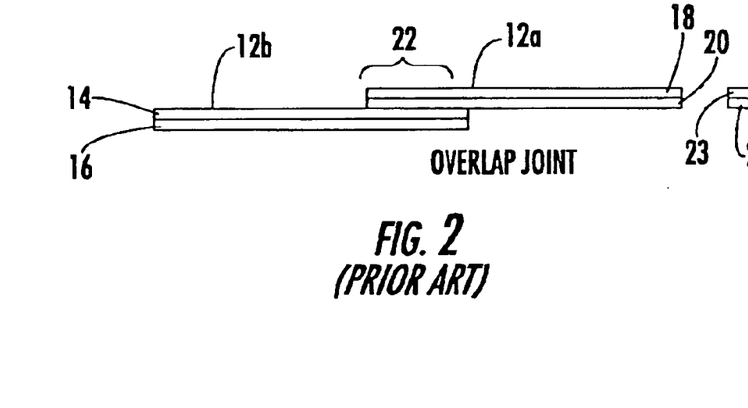
FIG. 2 is a schematic view of a prior art overlap joint seam used to join two radome fabric sections.

As discussed in the Background section above, air supported flexible fabric structures such as radome 10, FIG. 1 are made of joined fabric sections 12a–12n joined by seams as shown for seam 22 joining fabric sections 12f and 12g. Typically, such structures employ seams defined by the overlap joint shown in FIG. 2 where fabric section 12a partially overlaps fabric section 12b. Each fabric section 12a–12n may be made up of layers or plies 14 and 16 as shown for fabric section 12b, FIG. 2 and plies 18 and 20 as shown for fabric section 12a. As can be seen in FIG. 2, the overlap area 22 is much thicker than (i.e. at least twice the thickness of) the thickness of individual fabric sections 12a or 12b. In a typical example, the width of the area of overlap 22 is about five inches, although it will be understood that the width of the area of overlap 22 is dependent upon many factors, such as the strength of the fabric and the loads to which the structure must react.

Figure 3:
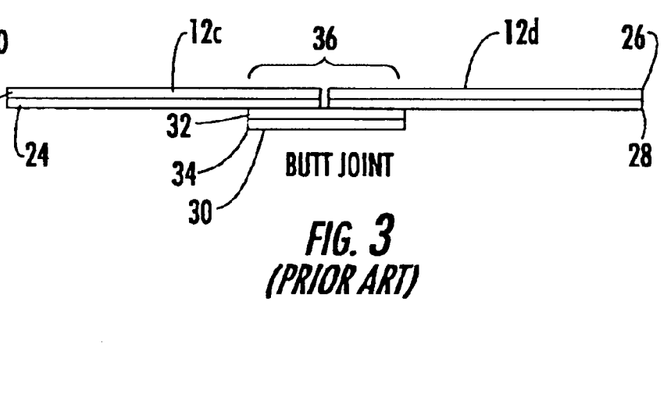
FIG. 3 is a schematic view of a prior art butt-joint seam joining two radome fabric sections.

Another prior art fabric seam configuration is shown in FIG. 3. In FIG. 3, a so-called butt-joint is formed. The butt-joint seam consists of two sections 12c and 12d of fabric each comprising, in this example, plies 23 and 24 of section 12c and layers 26 and 28 of section 12d. In the butt-joint configuration of FIG. 3, fabric sections 12c and 12d are secured together by a third bridging piece of fabric or material 30 also consisting of layers or plies 32 and 34. Again, the result is the same: seam 36 is at least twice the thickness of fabric sections 12c and 12d alone.

In both the overlap joint and butt-joint seam configurations, fabric plies are directly aligned on top of one another. For the overlap joint of FIG. 2, section 12a is aligned on top of section 12b at overlap area 22. For the butt-joint configuration of FIG. 3, fabric sections 12c and 12d are aligned directly on top of the additional piece of fabric or material 30. Thus, in both the prior art overlap joint seam of FIG. 2 and the prior art butt-joint seam of FIG. 3, there are severe thickness discontinuities in the resulting structure. These thickness discontinuities cause localized stresses which increase the strength demands of the overall structure, and produce radio frequency (RF) losses and performance reduction in radomes.

A high strength fabric structure, uniform in thickness, in accordance with this invention, in contrast, does not typically employ the overlap or butt-joints of the prior art shown in FIGS. 2 and 3. In one embodiment of the invention, a high strength flexible fabric structure (such as a radome 100, FIG. 6) includes a plurality of fabric sections 42 and 44, FIGS. 4 and 5. Each section 42 and 44 including a plurality of plies: section 42 includes plies 46, 48, and 50 preferably of alternating fiber orientation and section 44 includes plies 52, 54, and 56 also of alternating fiber orientation. Ply 46 has a first fiber orientation, ply 48 has a second fiber orientation, and ply 50 has the same orientation as ply 46. In the preferred embodiment, first ply 46 has fibers 80 and 82 oriented at 0° and 90°, respectively. Second ply 48 has a biased fiber orientation with fibers 88, 90 typically biased at ±45°. The third ply 50 also has fibers 84, 86 oriented at 0° and 90°, respectively.

Figure 5:
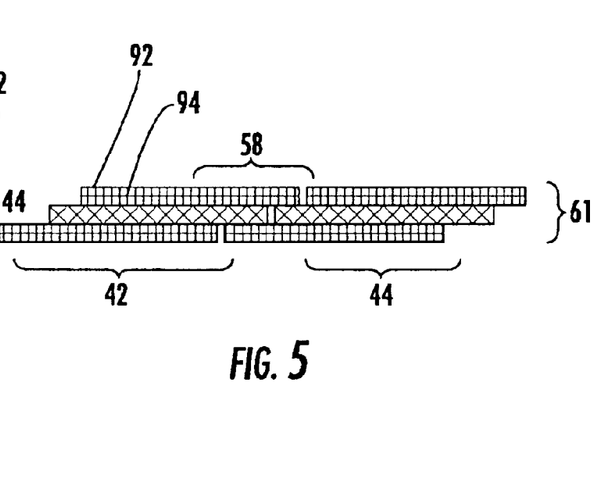
FIG. 5 is a schematic cross-sectional view of two joined sections of flexible fabric showing the uniform thickness seam of this invention.

FIG. 5 shows uniform thickness joint or seam area 58 where the plies or sections 42 and 44 meet. This uniform thickness seam is formed by offsetting the individual plies 46, 48, 50, 52, 54, and 56 of each section without any overlap of plies of like fiber orientation. In this way, the thickness at seam 58 is the same as or substantially the same as thickness 61 of each fabric section individually.

Figure 4:
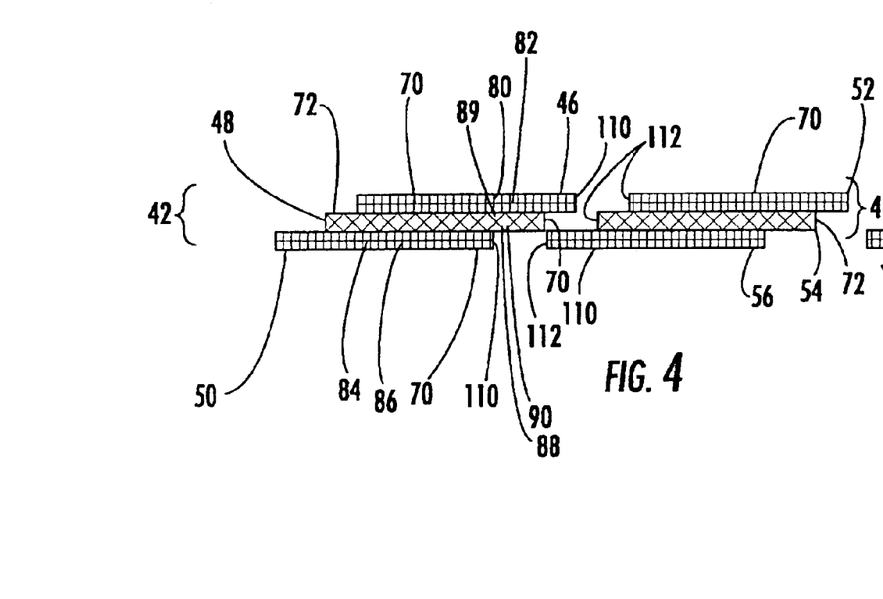
FIG. 4 is a schematic cross-sectional view of two sections of a high strength flexible fabric just prior to forming a uniform thickness seam in accordance with the present invention.

The fibers of each ply of each fabric section may be woven, knitted or unidirectional. Unlike woven fibers, unidirectional fibers are not intertwined, but rather may be laid out in alternating fiber orientation, as is known in the art, such as the alternating fiber orientation of fibers 88 and 90.

Also as is known in the art, knitted fibers are also not intertwined, but are stitched, for example at point of connection 89, rather than being solely laid out in alternating orientation as are unidirectional fibers. It is to be understood that the foregoing discussion with respect to fabric section 42 and its plies 46, 48, and 50 and their respective fiber orientation applies equally to fabric section 44 and its plies and their respective fiber orientation. Also, it will be understood that there may be any number of plies. In one preferred embodiment, only three plies are used as shown. Preferably, the fibers of each ply are disposed in a flexible matrix such as a polyurethane resin matrix material. The plies of each section 42 and 44 are typically heat welded together as are sections 42 and 44 at joint or seam 58. In one example, this seaming method is used to form radome 100, FIG. 6 surrounding a radar or antenna system within (not shown). As it is known in the art, other heat and pressure inducing practices may be used, such as lamination.

It will be further understood by those skilled in the art that the fibers may be combined to form yarn, and that reference to fibers or fiber orientation and the like herein refer equally to yarns comprised of fibers.

In the preferred embodiment, first section 42, FIGS. 4–5, includes edge 110 formed by first ply 46 extending outward of and in a staggered configuration from the second ply 48 which itself extends outward from third ply 50. Adjacent second section 44 has adjacent mating edge 112 formed by first ply 52 being offset inward from the second ply 54 which itself is offset inward of third ply 56. At seam 58, FIG. 5 between sections 42 and 44, first ply 46 of first section 42 is disposed on second ply 54 of second section 44 and second ply 48 of first section 42 is disposed on third ply 56 of second section 44.

A high strength flexible fabric structure in accordance with the subject invention is typically manufactured by forming a plurality of flexible fabric sections to each include a plurality of plies as described above. The following description applies to only fabric section 42 of a structure but it is to be understood that the same disclosure applies to any number of sections containing any number of plies of various fiber orientations.

As discussed above, the plies of each section are preferably of alternating fiber orientation. The plies of each section 42, 44 are offset as shown and adjacent sections 42, 44, FIG. 5 are joined, such that no plies of like fiber orientation overlap for added strength. Preferably there are at least three plies in each section: section 42 includes plies 46, 48, and 50 and section 44 includes plies 52, 54, and 56. Ply 46 may be woven fibers oriented at 0° and 90°; second ply 48 has a woven biased fiber orientation; and third ply 50 has fibers woven to be oriented at 0° and 90°. Preferably second ply 48 has fibers biased at ±45°. Ply 52 of fabric section 44 is the same as ply 46 of section 42, ply 54 is the same as ply 48, and ply 56 is the same as ply 50. In one example, the fibers have a length of several hundred feet and are typically from 200 to 5000 denier. In the same example, the thickness of plies 46, 50, 52 and 56 having the ±90° fiber orientation is ordinarily about 0.015 inches, while the thickness of biased plies 48 and 54 with the ±45° fiber orientation is about 0.030 inches. It will be understood by those skilled in the art that the fibers may be woven, as discussed above, or the fibers may be knitted or unidirectional.

Figure 6:
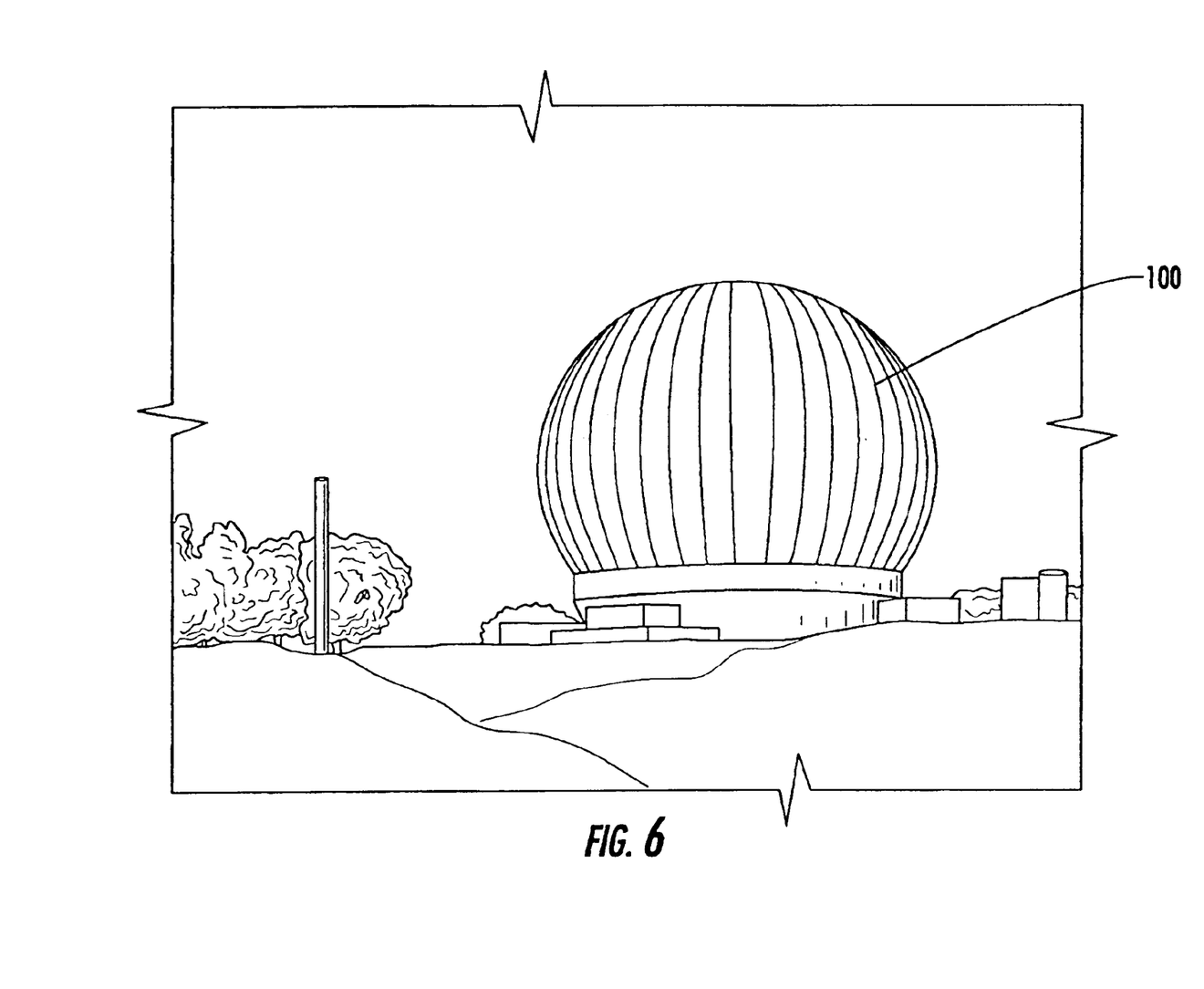
FIG. 6 is a schematic view of a radome made in accordance with the method of this invention.

The method of the subject invention may further include the step of configuring joined flexible fabric section 42, 44 (and many other similarly joined sections) as radome covering 100, FIG. 6. Typically, first ply 46 of first section 42 is extended outward from second ply 48 and second ply 48 is extended outward from third ply 50. Similarly, first ply 52 of second section 44 is offset inward from second ply 54 and second ply 54 is offset inward from third ply 56 of second section 44. The joining step may include disposing or stacking the extending portion of first ply 46 of first section 44 on second ply 54 of section 44 and disposing or stacking the extending portion of second ply 48 of first section 42 on third ply 56 of second section 44. Heat welding operations, or equivalent heat and pressure inducing practices, such as lamination, are then performed.

The method of the present invention also similarly includes forming a plurality of fabric sections 42 and 44 and structuring and arranging each section to abut and join each other section without any overlap between the sections thereby forming a fabric structure and seam 58 of uniform thickness.

The subject invention thus results in a high strength fabric structure with uniform thickness. Typically, no overlapping or butt-joint seams are used. The seaming technology disclosed herein can be used in flexible fabric structures and air-supported structures such as radomes, engineered inflatables, architectural fabrics, and industrial fabrics. For radomes, radiowave frequency (RF) losses are reduced as are the power requirements and cost of the radar antenna system protected by the radome. In general, a high strength fabric seam with uniform thickness and lower RF losses is achieved by orienting layers or plies of fibers in a matrix material and by stacking the plies at the seam in a staggered or offset configuration. The structure and seam of this invention is well-suited for a radome for an X-band radar system, but this invention is not limited to such a radome or structure.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims:

What is claimed is:

1. A high strength flexible fabric structure comprising:
   a plurality of flexible fabric sections, each section including a plurality of plies of alternating fiber orientation; and
   a joint between adjacent sections wherein the plies of each section are offset to form a uniform thickness seam between the two sections without any overlap of plies of like fiber orientation.

2. The high strength flexible fabric structure of claim 1 in which there are at least three plies in each section.

3. The high strength flexible fabric structure of claim 2 in which a first ply has fibers oriented at 0° and 90°, a second ply has biased fibers, and a third ply has fibers oriented at 0° and 90°.

4. The high strength flexible fabric structure of claim 3 in which the second ply has fibers biased at ±45°.

5. The high strength flexible fabric structure of claim 2 in which a first section includes an edge with a first ply thereof extending outward from a second ply which extends outward from a third ply and the adjacent second section has an adjacent edge with a first ply thereof offset inward of a second ply which is offset inward of a third ply such that at the joint between the two sections, the first ply of the first section is disposed on the second ply of the second section, and the second ply of the first section is disposed on the third ply of the second section.

6. The high strength flexible fabric structure of claim 1 in which the ply fibers are woven.

7. The high strength flexible fabric structure of claim 1 in which the ply fibers are knitted.

8. The high strength flexible fabric structure of claim 1 in which the ply fibers are unidirectional.

9. The high strength flexible fabric structure of claim 1 in which the fibers of each ply are disposed in a flexible matrix material.

10. The high strength flexible fabric structure of claim 9 in which the matrix material is a polyurethane resin material.

11. The high strength flexible fabric structure of claim 1 in which the plies of each section are heat welded together.

12. The high strength flexible fabric structure of claim 1 in which the plies of each section are laminated together.

13. The high strength flexible fabric structure of claim 1 in which the sections are heat welded at the joint.

14. The high strength flexible fabric structure of claim 1 in which the sections are laminated at the joint.

15. The high strength flexible fabric structure of claim 1 in which the structure is a radome surrounding a radar system.

16. The high strength flexible fabric structure of claim 1 in which there are at least three plies in each section, the first ply having fibers oriented at 0° and 90°, the second ply having biased fibers, and the third ply having fibers oriented at 0° and 90° and in which the first section includes an edge with the first ply thereof extending outward from the second ply which extends outward from the third ply and the adjacent second section has an adjacent edge with the first ply thereof offset inward of the second ply which is offset inward of the third ply such that at the joint between the two sections the first ply of the first section is disposed on the second ply of the second section, and the second ply of the first section is disposed on the third ply of the second section.

17. A high strength flexible fabric structure comprising:
a plurality of flexible fabric sections, each section including a plurality of plies, each ply having fibers disposed in a flexible matrix; and
a joint between adjacent first and second sections wherein:
the first section has an edge with a first ply thereof extending outward from a second ply;
the second adjacent section has an edge with a first ply thereof offset inward from a second ply;
the first ply of the first section is disposed on the second ply of the second section;
the first section further including a third ply offset inward from the second ply of the first section;
the second adjacent section further including a third ply extending outward from the second ply of the second section; and
the second ply of the first section is disposed on the third ply of the second section.

18. The high strength flexible fabric structure of claim 17 in which the first ply of each section has fibers oriented at 0° and 90°, the second ply of each section has biased fibers, and the third ply of each section has fibers oriented at 0° and 90°.

19. The high strength flexible fabric structure of claim 18 in which the second ply has fibers biased at ±45°.

20. The high strength flexible fabric structure of claim 17 in which the ply fibers are woven.

21. The high strength flexible fabric structure of claim 17 in which the ply fibers are knitted.

22. The high strength flexible fabric structure of claim 17 in which the ply fibers are unidirectional.

23. The high strength flexible fabric structure of claim 17 in which the flexible matrix is a polyurethane resin material.

24. The high strength flexible fabric structure of claim 17 in which the plies of each section are heat welded together.

25. The high strength flexible fabric structure of claim 17 in which the plies of each section are laminated together.

26. The high strength flexible fabric structure of claim 17 in which the sections are heat welded at the joint.

27. The high strength flexible fabric structure of claim 17 in which the sections are laminated at the joint.

28. The high strength flexible fabric structure of claim 17 in which the structure is a radome surrounding a radar system.

29. A high strength flexible fabric structure comprising:
a plurality of flexible fabric sections, each section including at least three plies, a first ply having fibers oriented at 0° and 90°, a second ply having fibers biased at ±45° and a third ply having fibers oriented at 0° and 90°; and
a joint between adjacent sections wherein the plies of each section are offset to form a uniform thickness seam between two sections without overlap of plies of like fiber orientation.

30. The high strength flexible fabric structure of claim 29 in which the ply fibers are woven.

31. The high strength flexible fabric structure of claim 29 in which the ply fibers are knitted.

32. The high strength flexible fabric structure of claim 29 in which the ply fibers are unidirectional.

33. The high strength flexible fabric structure of claim 29 in which the structure is a radome surrounding a radar system.

34. A flexible fabric structure with uniform seam thickness comprising:
a first fabric section comprising:
a first ply including a plurality of fibers oriented in a first direction;
a second ply including a plurality of fibers oriented in a second direction;
a third ply comprising a plurality of fibers oriented in the first direction; and
a second fabric section comprising:
a first ply including a plurality of fibers oriented in the first direction;
a second ply including a plurality of fibers oriented in the second direction;
a third ply including a plurality of fibers oriented in the first direction;
wherein a joint between the first and second sections is structured and arranged such that the plies of the first section are in a staggered configuration with the plies of the second section such that the joint has a thickness the same as the thickness of the first and second fabric sections.

35. The fabric structure of claim 34 wherein the first direction is 0° and 90°.

36. The fabric structure of claim 34 wherein the second direction is ±45°.

37. The fabric structure of claim 34 wherein the fibers are disposed in a flexible resin matrix material.

38. A method of manufacturing a high strength flexible fabric structure, the method comprising:
forming a plurality of flexible fabric sections to each include a plurality of plies of alternating fiber orientation;

offsetting the plies of each section; and joining adjacent sections such that no plies of like fiber orientation overlap.

39. The method of claim 38 in which there are at least three plies in each section.

40. The method of claim 39 in which the first ply has fibers oriented at 0° and 90°, the second ply has biased fibers, and the third ply has fibers oriented at 0° and 90°.

41. The method of claim 40 in which the second ply has fibers biased at ±45°.

42. The method of claim 39 in which offsetting includes extending a first ply of a first section outward from a second ply thereof and extending the second ply outward from a third ply thereof and offsetting a first ply of the second section inward from a second ply thereof and offsetting the second ply inward from a third ply thereof.

43. The method of claim 42 in which joining includes disposing the first ply of the first section on the second ply of the second section and disposing the second ply of the first section on the third ply of the second section.

44. The method of claim 38 in which forming the flexible fabric sections includes weaving the ply fibers.

45. The method of claim 38 in which forming the flexible fabric sections includes disposing the fibers of each ply in a flexible matrix material.

46. The method of claim 45 in which the matrix material is a polyurethane resin material.

47. The method of claim 38 in which joining of the sections includes heat welding the plies of each section together.

48. The method of claim 38 in which joining of the sections includes laminating the plies of each section together.

49. The method of claim 38 in which joining of the sections includes heat welding the sections at the joint.

50. The method of claim 38 in which joining of the sections includes laminating the sections at the joint.

51. The method of claim 38 further including the step of configuring the flexible fabric sections as a radome covering.

52. A method for producing a flexible fabric structure of uniform thickness, the method comprising:

forming a first flexible fabric portion with a first ply of flexible fabric including a plurality of fibers oriented at 0° and 90°, a second ply of flexible fabric including a plurality of fibers oriented at ±45°, and a third ply of flexible fabric including a plurality of fibers oriented at 0° and 90°, stacking the first, second, and third plies; and joining the first, second, and third plies with like oriented plies of a second flexible fabric portion in an offset configuration and forming a uniform thickness seam.

53. A high strength flexible fabric seam comprising:

at least two flexible fabric sections, each section including a plurality of plies of alternating fiber orientation, wherein the plies of each section are offset and joined without any overlap of plies of like fiber orientation.

54. The high strength flexible fabric seam of claim 53 in which there are at least three plies in each section.

55. The high strength flexible fabric sewn of claim 54 in which the first ply has fibers oriented at 0° and 90°, the second ply has biased fibers, and the third ply has fibers oriented at 0° and 90°.

56. The high strength flexible fabric seam of claim 55 in which the second ply has fibers biased at ±45°.

57. The high strength flexible fabric seam of claim 54 which a first section includes an edge with the first ply thereof extending outward from the second ply which extends outward from the third ply and the adjacent second section has an adjacent edge with the first ply thereof offset inward of the second ply which is offset inward of the third ply such that the first ply of the first section is disposed on the second ply of the second section, and the second ply of the first section is disposed on the third ply of the second section.

58. The high strength flexible fabric seam of claim 53 in which the ply fibers are woven.

59. The high strength flexible fabric seam of claim 53 in which the ply fibers are knitted.

60. The high strength flexible fabric seam of claim 53 in which the ply fibers are unidirectional.

61. The high strength flexible fabric seam of claim 53 in which the fibers of each ply are disposed in a flexible matrix material.

62. The high strength flexible fabric seam of claim 61 in which the matrix material is a polyurethane resin material.

63. The high strength flexible fabric seam of claim 53 in which the plies of each section are heat welded together.

64. The high strength flexible fabric seam of claim 53 in which the plies of each section are laminated together.

65. The high strength flexible fabric seam of claim 53 in which the sections are heat welded together.

66. The high strength flexible fabric seam of claim 53 in which the sections are laminated together.

67. The high strength flexible fabric seam of claim 53 in which there are at least three plies in each section, the first ply having fibers oriented at 0° and 90°, the second ply having biased fibers, and the third ply having fibers oriented at 0° and 90° in which a first section includes an edge with the first ply thereof extending outward from the second ply which extends outward from the third ply and the adjacent second section has an adjacent edge with the first ply thereof offset inward of the second ply which is offset inward of the third ply such that the first ply of the first section is disposed on the second ply of the second section, and the second ply of the first section is disposed on the third ply of the second section.

68. A high strength flexible fabric seam comprising:

at least two flexible fabric sections, each section including a plurality of plies, each ply having fibers disposed in a flexible matrix wherein the first section has an edge with a first ply thereof extending outward from a second ply;

the second adjacent section has an edge with a first ply thereof offset inward from a second ply;

the first ply of the first section is disposed on the second ply of the second section;

the first section including a third ply offset inward from the second ply of the first section;

the second adjacent section including a third ply extending outward from the second ply of the second section; and the second ply of the first section is disposed on the third ply of the second section.

69. The high strength flexible fabric seam of claim 68 in which the first ply of each section has fibers oriented at 0° and 90°, the second ply has biased fibers, and the third ply has fibers oriented at 0° and 90°.

70. A flexible fabric seam with uniform thickness comprising:

a first fabric section comprising:

a first ply including a plurality of fibers oriented in a first direction;

a second ply including a plurality of fibers oriented in a second direction;

a third ply comprising a plurality of fibers oriented in the first direction; and a second fabric section comprising:
a first ply including a plurality of fibers oriented in the first direction;
a second ply including a plurality of fibers oriented in the second direction;
a third ply including a plurality of fibers oriented in the first direction;
wherein the plies of the first section are in a staggered configuration with and joined with the plies of the second section such that the seam has a thickness equal to a combined thickness of the first, second, and third layers of the first and second fabric sections.

71. A method of manufacturing a high strength flexible fabric seam, the method comprising:
forming a plurality of flexible fabric sections to each include a plurality of plies of alternating fiber orientation;
offsetting the plies of each section; and
joining adjacent sections such that no plies of like fiber orientation overlap.

72. The method of claim 71 in which offsetting includes extending the first ply of a first section outward from the second ply thereof and extending the second ply outward from the third ply thereof and offsetting the first ply of the second section inward from the second ply thereof and offsetting the second ply thereof inward from the third ply thereof.

73. The method of claim 72 in which joining includes disposing the first ply of the first section on the second ply of the second section and disposing the second ply of the first section on the third ply of the second section.

74. A method of manufacturing a high strength flexible fabric seam, the method comprising:
forming a plurality of flexible fabric sections to each include at least three of plies of alternating fiber orientation;
offsetting the plies of each section;
joining adjacent sections such that no plies of like fiber orientation overlap;
weaving the ply fibers; and
disposing the fibers of each ply in a flexible matrix material.

75. A radome structure comprising:
a plurality of flexible fabric sections, each section including a plurality of plies of alternating fiber orientation; and
a joint between adjacent sections wherein the plies of each section are offset to form a uniform thickness seam between the two sections without any overlap of plies of like fiber orientation.

76. A high strength flexible fabric structure comprising:
a plurality of flexible fabric sections, each section including a plurality of plies, each ply having fibers disposed in a flexible matrix; and
a joint between adjacent first and second sections wherein:
the first section has an edge with a first ply thereof extending outward from a second ply;
the second adjacent section has an edge with a first ply thereof offset inward from a second ply;

the first ply of the first section is disposed on the second ply of the second section;
the first section further including a third ply offset inward from the second ply of the first section;
the second adjacent section further including a third ply extending outward from the second ply of the second section;
the second ply of the first section is disposed on the third ply of the second section; and
the first ply of each section having fibers oriented at 0° and 90°, the second ply of each section having biased fibers, and the third ply of each section having fibers oriented at 0° and 90°.

77. The high strength flexible fabric structure of claim 76 in which the second ply has fibers biased at ±45°.

78. A high strength flexible fabric structure comprising:
a plurality of flexible fabric sections, each section including a plurality of plies, each ply having unidirectional fibers disposed in a flexible matrix; and
a joint between adjacent first and second sections wherein:
the first section has an edge with a first ply thereof extending outward from a second ply;
the second adjacent section has an edge with a first ply thereof offset inward from a second ply; and
the first ply of the first section is disposed on the second ply of the second section.

79. A high strength flexible fabric seam comprising:
at least two flexible fabric sections, each section including a plurality of plies, each ply having fibers disposed in a flexible matrix wherein the first section has an edge with a first ply thereof extending outward from a second ply;
the second adjacent section has an edge with a first ply thereof offset inward from a second ply;
the first ply of the first section is disposed on the second ply of the second section;
the first section including a third ply offset inward from the second ply of the first section;
the second adjacent section including a third ply extending outward from the second ply of the second section;
the second ply of the first section disposed on the third ply of the second section; and
the first ply of each section having fibers oriented at 0° and 90°, the second ply having biased fibers, and the third ply having fibers oriented at 0° and 90°.

80. A radome surrounding a radar system comprising:
a plurality of flexible fabric sections, each section including a plurality of plies, each ply having fibers disposed in a flexible matrix; and
a joint between adjacent first and second sections wherein:
the first section has an edge with a first ply thereof extending outward from a second ply;
the second adjacent section has an edge with a first ply thereof offset inward from a second ply; and
the first ply of the first section is disposed on the second ply of the second section.

81. The radome surrounding a radar system of claim 80 in which:
the first section further includes a third ply offset inward from the second ply of the first section;
the second adjacent section further includes a third ply extending outward from the second ply of the second section; and the second ply of the first section is disposed on the third ply of the second section.

82. The radome surrounding a radar system of claim 81 in which the first ply of each section has fibers oriented at 0° and 90°, the second ply of each section has biased fibers, and the third ply of each section has fibers oriented at 0° and 90°.

83. The radome surrounding a radar system of claim 82 in which the second ply has fibers biased at ±45°.

84. The radome surrounding a radar system of claim 80 in which the ply fibers are unidirectional.

* * * * *